United States Patent [19]
Saly et al.

[11] Patent Number: 5,148,758
[45] Date of Patent: Sep. 22, 1992

[54] FLOATING RECYCLING AND TRANSFER STATION

[75] Inventors: Udi E. Saly, Newton Center; Brent Dibner, Chestnut Hill, both of Mass.

[73] Assignee: Flexible Environmental Systems, Inc., Boston, Mass.

[21] Appl. No.: 759,173

[22] Filed: Sep. 13, 1991

Related U.S. Application Data

[63] Continuation-in-part of Ser. No. 532,194, Jun. 1, 1990, Pat. No. 5,063,862.

[51] Int. Cl.⁵ ............................................. F23G 5/02
[52] U.S. Cl. ................................ 110/220; 110/233; 110/241; 110/346; 114/26; 114/32
[58] Field of Search ............... 110/346, 240, 241, 233, 110/349, 219, 220; 114/26, 32

[56] References Cited

U.S. PATENT DOCUMENTS

| | | | |
|---|---|---|---|
| 2,442,686 | 6/1948 | Guerchoux | 114/26 |
| 4,552,082 | 11/1985 | Grey | 114/26 |
| 4,750,437 | 6/1988 | Rouse | 110/346 |
| 5,067,425 | 11/1991 | Sporleder | 114/26 |

OTHER PUBLICATIONS

*The Boston Sunday Globe* "Firm Proposes Burning City's Waste at Sea", David Warsh, Jun. 3, 1990.
*The Boston Sunday Globe,* Environment Watch, "Smoke on the Water", Nick Tate, Jun. 3, 1990.

*Primary Examiner*—Edward G. Favors
*Attorney, Agent, or Firm*—Fish & Richardson

[57] ABSTRACT

A system for processing sold municipal waste and non-hazardous commercial waste comprises a multi-level floating marine vessel tied up alongside a dock. The vessel has a processing deck for processing incoming solid waste materials into multiple lines of material-specific recycling bins arranged symmetrically with respect to the midships region of the vessel. The vessel has forward and aft overhangs on the processing deck level big enough to drop load non-recyclable waste at the end of each said line into refuse barges moored directly below said overhangs. The vessel preferably has a tipping deck located above and approximately coextensive with said processing deck on the vessel with at least one opening accessible to trucks from the dock for loading solid waste onto the vessel. A bailing and storage deck located below the processing deck on the vessel has an opening accessible to trucks from the dock for unloading recyclables.

15 Claims, 3 Drawing Sheets

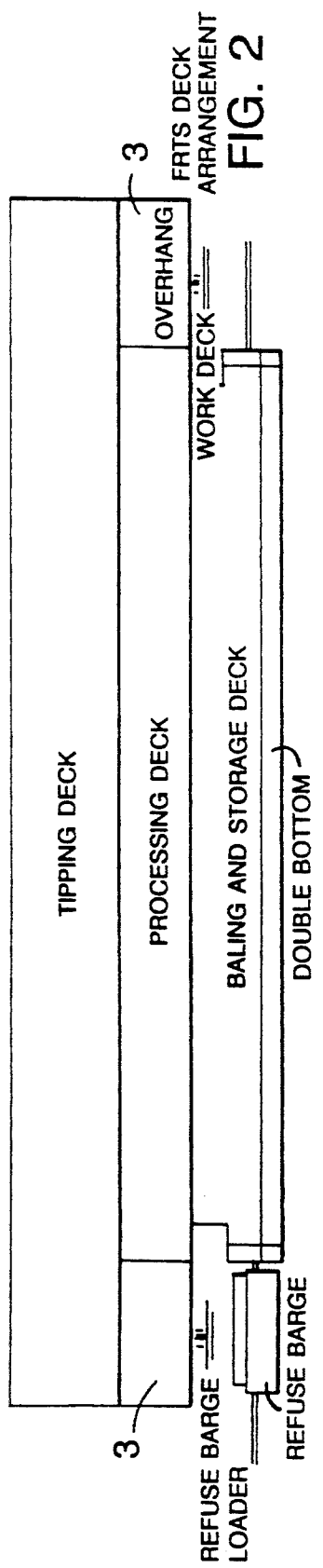
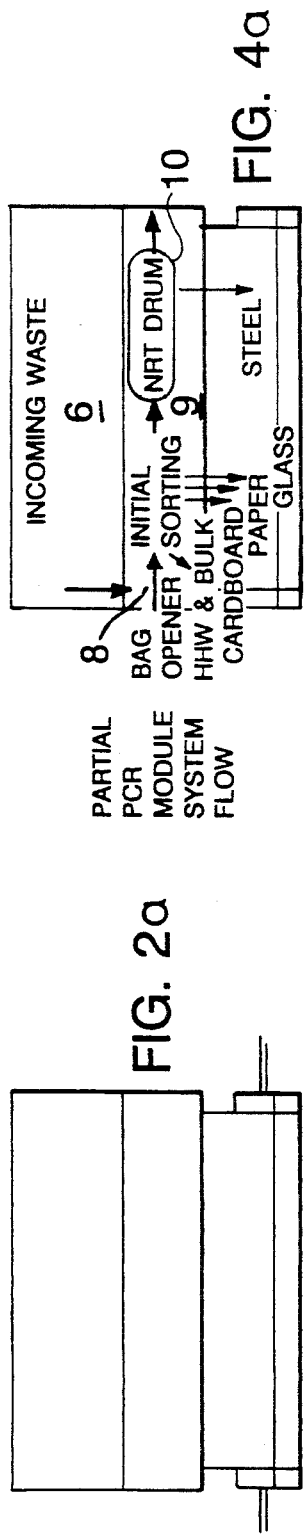
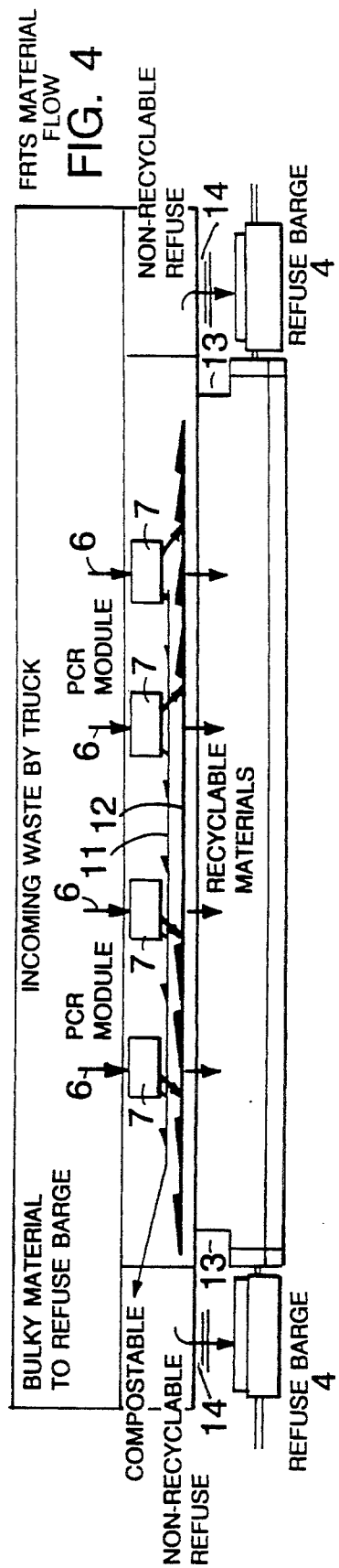

FLOATING RECYCLING AND TRANSFER STATION

CROSS-REFERENCE TO RELATED APPLICATION

This application is a continuation-in-part of application Ser. No. 07/532,194, filed Jun. 1, 1990, U.S. Pat. No. 5,063,862 entitled Solid Waste Reclamation and Processing Method, by Udi E. Saly and Brent Dibner, assigned to the same assignee as the present application and incorporated by reference herein in its entirety.

BACKGROUND OF THE INVENTION

Certain coastal cities transport municipal solid waste in barges for disposal of the waste in landfills. Additional coastal cities will be looking to this inexpensive method of transportation as available landfill sites become more distant. Barges are typically loaded at a "Marine Transfer Station" (MTS), which is an elevated pier (usually enclosed within a building) with arrangements for garbage trucks to dump their loads directly into a barge. A number of such operations are in place, the most extensive of which is the marine transfer station system in New York City.

In addition to the need to transport over longer distances, the necessity to recycle a large fraction of the waste stream is becoming more urgent. One recycling method is the reclamation of recyclable materials from the unsorted waste stream. Referred to as post collection recycling, these systems are emerging as a competitive method to recycle valuable materials and to reduce the amount of waste disposed of in landfills.

This invention combines a marine transfer station with a post collection recycling system and places the entire recycling and barge transfer operation on a floating structure.

SUMMARY OF THE INVENTION

The invention features systems and methods for recycling and handling of solid waste (e.g. municipal solid waste) that uses floating facilities to bear such systems and facilities.

A solid waste floating recycling and transfer station (FRTS) combines a barge borne post collection recycling facility with a marine transfer station operation. The system is designed to replace existing pier-based marine transfer station operations in order to recover recyclable materials from the waste stream prior to disposal of the garbage truck contents into refuse barges for transportation to a landfill or any other disposal site.

The FRTS is designed to process non-industrial commercial and residential municipal solid waste (MSW) collected by trucks. The waste is delivered to the permanently moored FRTS for recycling and processing of mixed waste and bagged source-separated recyclables. The barge is moored at a pier and receives MSW delivered by trucks.

In the preferred embodiment, a multi-level floating marine vessel is tied up alongside a dock. The vessel has a processing deck for processing incoming solid waste materials into multiple lines of material-specific recycling bins arranged symmetrically with respect to the midships region of the vessel. The vessel has forward and aft overhangs on the processing deck level big enough to drop load non-recyclable waste at the end of each said line into refuse barges moored directly below said overhangs. The vessel preferably has a tipping deck located above and approximately coextensive with said processing deck on the vessel with at least one opening accessible to trucks from the dock for loading solid waste onto the vessel. A bailing and storage deck located below the processing deck on the vessel has an opening accessible to trucks from the dock for unloading recyclables.

This system is ideally suited for major coastal cities because:

it is space efficient in its design;

it is a floating structure and does not use valuable land;

it utilizes and enhances the advantages of marine-based transportation;

source-separated recyclables and mixed MSW can be brought to one multi-purpose processing facility;

all outgoing materials can be transported by barge with no additional truck traffic, thereby minimizing impact on neighborhoods.

BRIEF DESCRIPTION OF THE DRAWINGS

FIGS. 2 and 2a are longitudinal and cross-sectional views the floating recycling and transfer station deck arrangements.

FIG. 4 is an overall material flow diagram of the floating recycling and transfer station system, and FIG. 4a is a cross-sectional view of FIG. 4.

DETAILED DESCRIPTION

Figure 1:
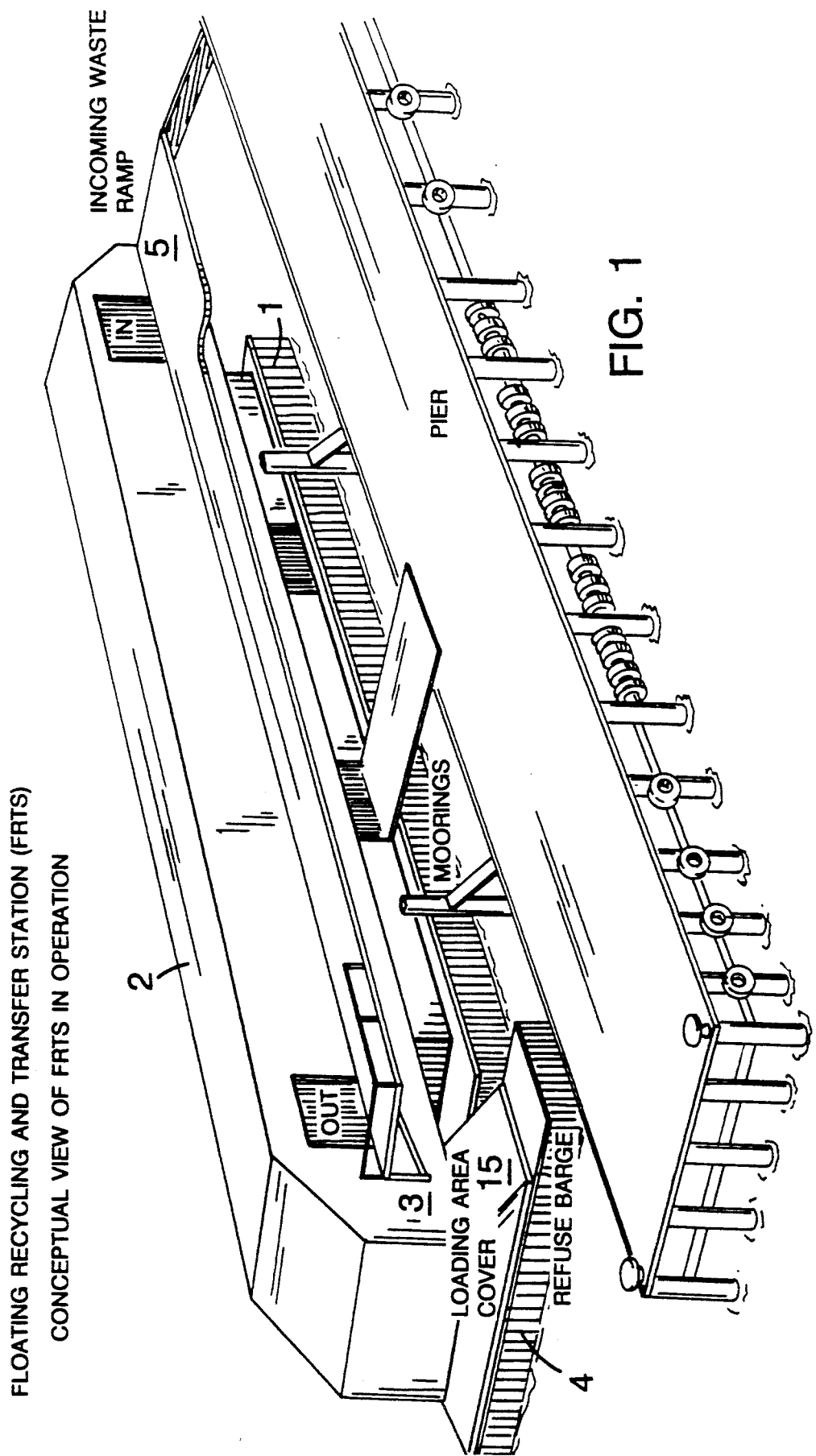
FIG. 1 is an artist's impression of the floating recycling and transfer station at its permanent mooring site, showing one refuse barge being loaded.

The Floating Recycling and Transfer Station is a fully enclosed special design barge shown in FIG. 1. The vessel's hull 1 is a simple rectangular barge. The barge dimensions depend on the recycling system capacity. The design calls for approximately 50 feet of length per each 400 ton per day capacity. The standard 1,600 ton per day barge is 250 feet long and 100 feet in beam. The deckhouse 2, which is the barge upper structure ("superstructure"), is longer than the barge hull, and has structural cantilevered overhangs 3 of approximately 45 feet on each end of the barge. The cantilevered portion of the superstructure covers a docking area for unloading of processed non recyclable waste onto refuse barges 4. The facility accepts unsorted MSW as well as bagged recyclables and yard waste co-collected with mixed waste. The incoming material is tipped on the top deck where initial sorting directs the materials to the appropriate processing lines. Bulk items are separated at this stage. Materials drop down to the second deck where multiple conveyor lines move the material through the various manual and mechanical processes for recyclable material recovery and separation. The system is designed in a modular manner, with a number of parallel recycling line modules on the sorting deck. The lower deck is used for further processing, baling, crushing and storing of recyclable materials. Non-recyclable residue is dumped directly into 150'×35' garbage barges moored under an overhang at both ends of the FRTS barge.

Standard recyclable materials are recovered including: corrugated cardboard, newsprint, high grade paper, mixed paper, glass, aluminum, steel, and plastic. In addition, a leaf and yard waste stream is separated for composting.

Post Collection Recycling

Post collection recycling is a relatively new, but rapidly growing method of recovering recyclable and compostable materials from the waste stream. The principal governing a post collection recycling approach is that a single collection for all trash and recyclables and one processing location for these co-collected materials is the most cost effective alternative available for maximum recyclable material recovery. Collection has proved to be the single-largest component of recycling program costs in New York City and in other large metropolitan areas. In addition to the high costs of multiple collections, commingled materials still have to be processed in a Material Recovery Facility (MRF). While MRF processing costs are lower than PCR costs, the combined collection and processing for commingled materials outweighs the PCR processing costs.

Co-collecting designated recyclable materials in color coded plastic bags along with the regular trash allows for continued source separation and participation in recycling by households, but does not involve the increased costs associated with multiple collections. The PCR system includes processing not only of the materials separated in bags, but also reclaims recyclable materials from the entire waste stream. This PCR system greatly benefits from source separation but is not dependent on rates of participation and diversion because the entire waste stream is sorted and processed.

System Description

The floating recycling and transfer station (FRTS) facilitates unloading of waste from collection trucks, comprehensive recycling of such waste and offloading of the non-recyclable residue into refuse barges. It is designed to recover as much recyclable material as possible utilizing existing post collection recycling technology prior to disposal of the waste into the garbage barges.

The unique design efficiently uses available space and takes advantage of the marine structure by utilizing the vertical space and multiple decks of a barge. A series of chutes is used to move materials from one level to the next, thereby minimizing the amount of conveyor systems needed to transport materials from one processing point to the next. No other known recycling facility utilizes a similar multi-level approach. FIGS. 2 and 2a describe the different decks of the floating recycling and transfer station, and FIGS. 4 and 4a show the waste flow utilizing this multiple level approach. At the end of the recycling process, the non-recyclable residue is loaded onto barges or railcar floats for trans port to landfills or incineration facilities. The recyclable materials are likewise removed by barges or railcar floats for shipment to reprocessing plants. Certain materials are transferred to truck for shipment.

The selected post collection recycling system processes the following materials out of the general waste stream:
Newsprint
Cardboard
Steel containers
Aluminum
Glass—by color
Plastic—by type The system is also designed to separate and package the following items for shipment to special handling outlets:
Household hazardous wastes (HHW)
Car batteries
White goods (refrigerators, washing machines, etc.)
Bulky items (sofas, mattresses, etc.)
Tires
Some of the organic portion of the waste stream is shipped to composting facilities.

Figure 3:
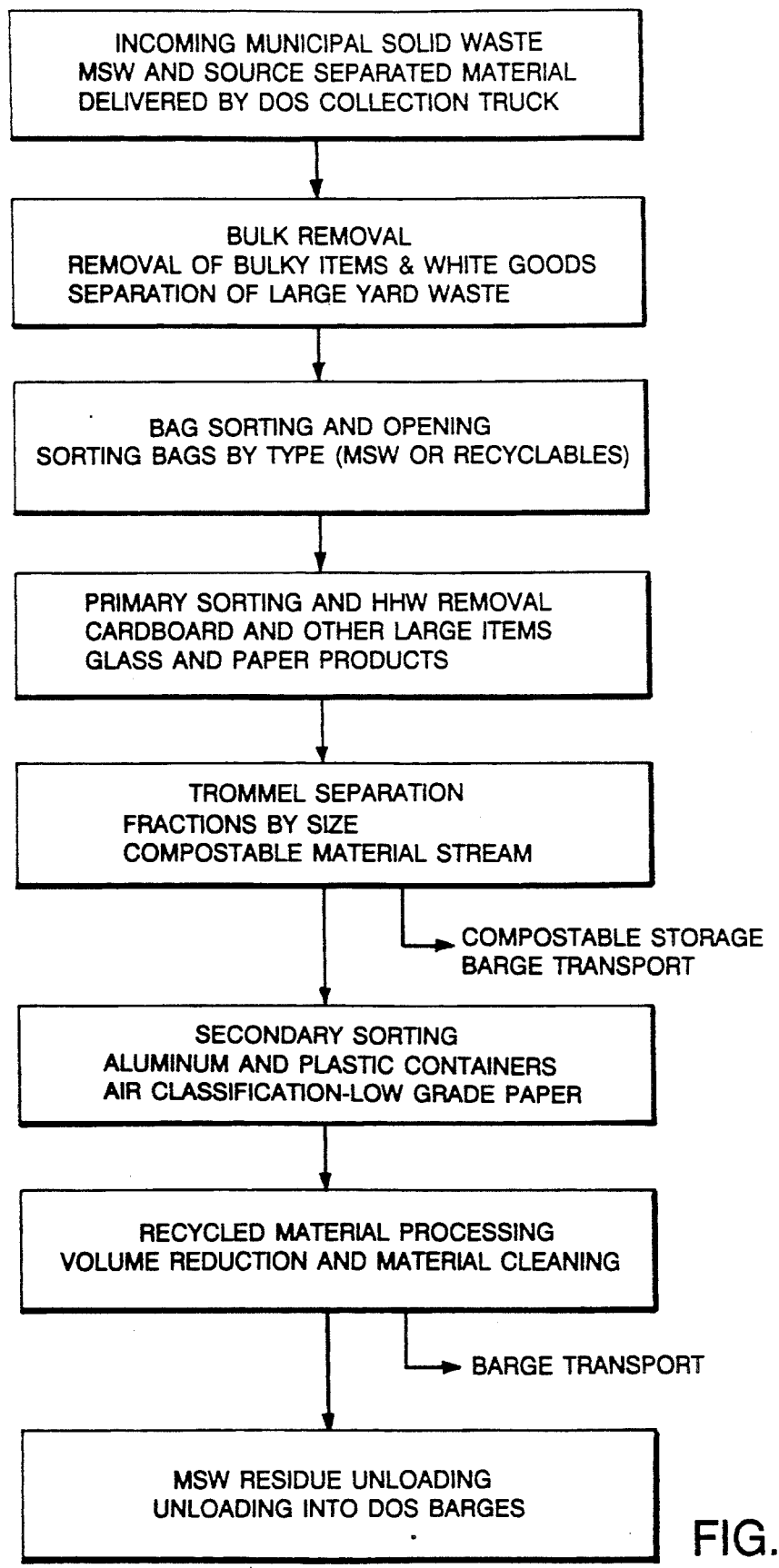
FIG. 3 is a material flow diagram of the waste stream and the recycling systems in its various recycling stages.

FIGS. 3 and 4 describe the FRTS proposed material flow.

Collection and Delivery of Municipal Solid Waste

The FRTS is designed to receive both unsorted waste and source separated recyclables directly from collection trucks. Customers of the system are encouraged to co-collect recyclables and trash in a single collection vehicle. It is likely that the waste and recyclables arrive at the recycling barge in different colored bags. The bags containing recyclables are manually separated into a separate stream for processing utilizing the same equipment as mixed MSW but bypassing the rotary separator.

Dumping of Waste at the FRTS

Packer trucks enter the barge via the access ramp 5 shown in FIG. 1. The ramp is designed to hinge onto the barge deck and move along the pier with the tide motion. This design requires the trucks to be elevated a maximum of approximately 35' and thus with a 30% grade would require a 105' long ramp.

A scale is located at the top portion of the ramp with an enclosed scalehouse-traffic control island adjacent to the scale. The packer trucks enter the upper deck tipping area via an entrance from the ramp and pull forward along the designated travel lane and back into one of the unloading bays 6 as directed by tipping floor personnel. After tipping their contents the packer trucks pull out into the travel lane and proceed to the barge exit and onto the off-ramp.

The packer truck unloading bays are clustered around each of the recycling line feeding chutes. The standard design refers to a 1,600 ton per day system capacity, which has four parallel systems. Four depressed steel conveyors lead to four chutes which allows the waste to drop down to the processing deck as shown in FIG. 4, where the sorting and processing occurs. The conveyors are approximately 30' long by 5' wide.

Multi-Line System

The standard system is designed with four PCR modules 7 processing approximately 400 TPD each for a total capacity of 1600 tons per day. The floating recycling and transfer station may be designed and constructed as a larger facility in 400 ton per day capacity (approximately 50 feet of barge length) increments.

The primary sorting operations are replicated in each of the lines, but certain processes are shared between the four lines. After materials are separated from the waste stream in each line, they move by conveyor to shared storage and baling operations. With the exception of compostable materials, the barge is a mirror image with two symmetrical lines on each side of the midships section and with conveyors leading to balers at both ends of the barge.

Initial Sorting

A front end loader is assigned to each of the four conveyors on the tipping floor. The operator feeds the conveyor while also removing oversized materials including white goods, tires, and wood products. Oversized materials which can be recycled are stored at one end of the tipping floor in containers. These containers are removed by truck when they are full. Non-recyclable bulky items are brought to the end of the floor to a chute feeding the refuse barge.

Bag Opening

To maximize the amount of recyclables recovered, a non-destructive plastic bag opening system 8 is required. The system opens bags without breaking glass containers or rupturing automobile batteries and other household hazardous waste which may be contained in garbage bags. Such systems are being developed by several U.S. firms with estimated commercial operation in late 1991.

Material Handling

The MSW stream is transported between processing steps by a series of thick rubber, high-walled, conveyor belts. The efficiency of magnetic separation of ferrous metals, eddy current separation of nonferrous metals and manual separation of glass bottles and plastic containers is directly effected by the depth of materials on the conveyor belt. This "burden depth" is kept to a minimum by proper design of the conveyor belt system.

Manual Picking

A wide conveyor belt with stations for pickers 9 is used for the first primary sorting operation. Materials to be manually picked are ones that can be easily removed from the waste stream at the earliest stage of the operation or ones that should not be broken in the rotary separator which follows manual picking. These materials include corrugated cardboard, wood not previously separated, household hazardous waste (HHW), glass, and a variety of paper types.

The picking platform is approximately 55' long and has 5 picking stations per side for a total of 10 picking stations per line. The picking hierarchy, as materials move down the line are corrugated and other large items, paper, and finally glass.

Typical HHW items to be removed are lead-acid car batteries, paint-related products and household cleaning agents. Pickers separate the HHW and hold it in bins in the immediate area of the picking stations. At the end of each shift it is containerized and prepared for shipment to an independent licensed facility. Wood is also be removed at this stage and dropped through a chute to a conveyor serving all four lines which conveys the wood to storage bins on the lower deck.

Corrugated cardboard is removed next and is taken by conveyor to a dedicated baler. The conveyor and baler service all four lines. There are three paper streams: (1) newspapers, (2) magazines, and (3) mixed paper. Each has a dedicated chute, and a conveyor and baler, again servicing all four lines. The corrugated and paper conveyors are capable of variable speed operation and of reversing direction.

Glass is separated by color: clear, green, and brown. Each of the glass pickers has a conveniently located chute leading to a separate bin for each glass color.

Rotary Material Separator

After moving through the picking stations the waste stream enters a rotary waste separator 10. These systems are also known as trommels and are produced by a number of vendors supplying the recycling and waste fuel preparation industry. The following description is of a system manufactured by National Recovery Technologies of Nashville, Tennessee.

The trommel performs three functions. First, a series of knifes shred any remaining bags. Second, heavy undersized materials made up of broken glass, grit and humus are removed. This stream then enters a vibrating air classifier where the broken mixed glass is separated. The glass is conveyed to a storage bin which is sold as aggregate. The remaining material is primarily compostable and made up of food waste and other organic materials. It is conveyed via a conveyor 11 running the length of the vessel to the compostable material storage bunker at one end of the barge.

The third process uses a magnet to remove the ferrous metal. The ferrous materials, primarily steel and bi-metal cans, are deposited onto a conveyor which leads to a storage bin. This storage bin feeds ferrous metal batches to a second conveyor leading to a baler.

Aluminum Recovery

Aluminum is separated in a two step electromechanical eddy-current and pneumatic pulse process. The aluminum is conveyed to a storage bin. The bin feeds the aluminum onto a conveyor leading to a baler. This conveyor and baler are shared by the aluminum, ferrous metal and plastic.

Plastic Picking

Recyclable plastic containers such as HDPE, PET, and PVC are hand picked and dropped onto a conveyor. This leads to a central plastic picking area where the plastic is separated by type into appropriate bins. The plastic passes through a perforator prior to entering each bin. The storage bins feed onto the same conveyor used for aluminum and ferrous metal baling.

Residual Paper Sorting

In order to capture paper that was not picked out of the waste stream in the initial picking process, the residue stream undergoes pneumatic separation. At this stage the waste enters a chamber where it passes under a strong pneumatic vacuum which removes loose paper and plastic film by suction. The plastic film is manually removed prior to baling of the paper. This lowest grade mixed paper stream is conveyed to a baler which also serves as the backup baler for the other three paper streams.

Non-recyclable Residue

Non recyclable residue, now thoroughly sorted for recyclable and potentially hazardous contaminants, is dumped onto a conveyer belt 12 running the length of the FRTS barge. The conveyer leads the residue directly into a loading mechanism under the overhangs at both ends of the vessel where it is dumped into refuse barges.

The two ends of the FRTS barge are covered loading bays 13 designed to accommodate a standard 150 foot by 35 foot garbage (refuse) barge as shown in FIG. 4. Half of the residue from the recycling operation is conveyed to one end of the FRTS barge and the other half is conveyed to the other end.

Waste disposal barges 4 are moored perpendicularly at either end of the FRTS barge and are loaded directly from conveyors spanning the length of the smaller barges 14. A plow shaped mechanism traverses above the belt and throws off the residue to either side of the belt.

A skirt like structure 15 is lowered onto the residue barges to contain the residue as it is fed into the barge. When the barge is ready to be towed away the structure is lifted, and a net installed over the barge to contain the residue during transit to the landfill. The loading area skirt cover is shown in its lowered position in FIG. 1.

Recyclable Material Storage

The lower deck has storage capability and is accessible to truck traffic via a ramp from the dock. Recyclable materials are also be unloaded onto barges via a pallet lifter and crane. The storage bins, as appropriate, are walking floor equipped trailers. The baler operators also control and monitor the loading of these trailers and have the ability to distribute the loads using the walking floors.

Compostable Material

The compostable material storage bunker is walking floor equipped. The floor moves the material from the incoming conveyor, as well as feed it to the series of discharge conveyors leading to the refuse barge loading platform. The unloading occurs during the third shift into barges specifically designated to carry compostable materials.

Barge General Description

The Floating Recycling and Transfer Station is a self-contained steel barge with a simple rectangular hull. The vessel is a large steel deckhouse barge. Its dimensions are determined by the recycling system capacity. The design calls for approximately 50 feet of length per each 400 ton per day capacity. A 1,600 ton per day barge hull is 250 feet long and 105 feet in beam. The deckhouse, which is the barge upper structure ("superstructure"), is longer than the barge hull, and has structural cantilevered overhangs of approximately 45 feet on each end of the barge. The cantilevered portion of the superstructure covers a docking area for unloading of processed non-recyclable waste onto refuse barges (see FIG. 1 for general view of the barge).

The FRTS barge is designed for mooring alongside a pier in protected water, or along side an existing marine transfer station. The deckhouse encloses the tipping floor, the entire recyclable recovery and processing lines, and all control, service, maintenance and auxiliary machinery compartments. There are three decks as follows:

| DECK | DESIGNATION AND PROCESS |
|---|---|
| Upper Deck | Tipping floor |
| | Truck receiving area |
| | Bulky material removal |
| Tween Deck | Initial processing |
| | Bag opening |
| | Initial sorting |
| | Mechanical size sorting |
| | Secondary processing |
| | Manual Sorting |
| Tank Top | Recyclable processing |
| | Material processing |
| | Shredding and baling |
| | Storage |

| Approximated Principal Dimensions | |
|---|---|
| Length Overall | 250'0" |
| Beam | 105'0" |
| Depth | 25'0" |
| Full Load Draft | 9'7" |
| Length of Superstructure | 310'0" |
| Lightship | 4,000 tons |

General Configuration

The FRTS barge is a mild steel, longitudinally framed double hull barge with a single flush deck. The hull has a raked bow and a flat transom stern. The barge is stiffened with transverse web frames and longitudinal stiffeners. Various flats and compartments are located within the hull as are the transverse bulkheads.

A large deckhouse is located atop the main deck and is supported by external webs and internal transverse and longitudinal beams. The deckhouse has two principal decks within it. These decks enclose the entire PCR system including tipping areas, processing equipment, storage areas and all related mechanical systems. The deckhouse also encloses all personnel facilities, including washrooms, lockers, toilets and offices. They also enclose tool rooms, supply rooms, and auxiliary machinery.

At the fore and aft ends of the barge there is a 45 foot overhang extending from the processing deck. This overhang covers the docking bays for the two refuse barges and supports the refuse barge loading mechanism (see FIG. 2).

We claim:

1. A method of treating and transferring nonhazardous municipal residential and commercial solid waste on board a floating recycling and transfer station comprising of the steps of:
   loading said incoming waste originating on shore directly onto said floating structure;
   separating said incoming solid waste into recyclable material and a non-recyclable waste fraction on board said floating structure;
   processing said recyclable materials for storage and transportation; and
   transferring said non-recyclable waste fraction onto marine based barge transportation.

2. The method of claim 1 where said incoming waste is dumped on board a top level deck.

3. The method of claim 1 where said waste material processing takes place with a number of parallel post collection separation systems located on at least one lower deck of said floating vessel.

4. The method of claim 3 where said parallel processing systems are located axially symmetrically with respect to said floating vessel's midship region.

5. The method of claim 1 where said non-recyclable fraction is transferred to barges moored at both longitudinal ends of said floating vessel.

6. The method of claim 1, wherein said loading step is accomplished by land based trucks.

7. A floating recycling and transfer station for processing sold waste and transferring non-recyclable waste to at least one separate marine refuse barge, comprising
 a multi-level floating marine vessel having a processing deck at a level higher above the water line than the top of the refuse barge for processing incoming solid waste materials into multiple lines of material-specific recycling bins arranged symmetrically with respect to the midships region of the vessel,
 said vessel having forward and aft overhangs on said processing deck level big enough to drop load non-recyclable waste at the end of each said lines into refuse barges moored directly below said overhangs.

8. The transfer station of claim 7, wherein said vessel has a tipping deck above and approximately coextensive with said processing level.

9. The transfer station of claim 8, wherein said vessel has a bailing and storage deck below said processing deck.

10. The transfer station of claim 9, wherein said bailing storage deck as a side opening through which bailed recyclables can be unloaded.

11. The transfer station of claim 9, wherein said tipping deck has at least one side opening through which solid waste can enter.

12. The transfer station of claim 9, wherein said tipping deck has a pair of side openings through which solid waste hauling trucks can enter and exit after unloading.

13. A system for processing solid waste, comprising:
 a dock;
 a plurality of marine refuse barges;
 a multi-level floating marine vessel tied up alongside said dock having a processing deck at a level higher above the water line than the tops of the refuse barges for processing incoming solid waste materials into multiple lines of material-specific recycling bins arranged symmetrically with respect to the midships region of the vessel,
 said vessel having forward and aft overhangs on said processing deck level big enough to drop load non-recyclable waste at the end of each said line into refuse barges moored directly below said overhangs.

14. The system of claim 13, further comprising
 a tipping deck located above and approximately co-extensive with said processing deck on the vessel, said tipping deck having at least one opening accessible from the dock for loading solid waste onto the vessel;
 a bailing and storage deck located below the processing deck on the vessel, said bailing and storage deck having at least one opening accessible from the dock for unloading recyclables.

15. The system of claim 14, wherein said tipping deck and bailing and storage deck openings are accessible to trucks from the dock.

* * * * *

UNITED STATES PATENT AND TRADEMARK OFFICE
CERTIFICATE OF CORRECTION

PATENT NO. : 5,148,758

DATED : 09/22/92

INVENTOR(S) : Udi E. Saly et al.

It is certified that error appears in the above-identified patent and that said Letters Patent is hereby corrected as shown below:

On the title page, item (56):

In the References Cited, Other Publications, second reference, "The Boston Sunday Globe" should be --Boston Sunday Herald--.

In the Abstract, first line, "sold" should be --solid--.

Column 2, line 26, insert --of-- after "views".

Column 3, line 55, "trans port" should be --transport--.

Column 9, line 2, "sold" should be --solid--.

Signed and Sealed this

Thirtieth Day of November, 1993

Attest:

BRUCE LEHMAN

Attesting Officer

Commissioner of Patents and Trademarks